United States Patent [19]
Miller

[11] 3,878,710
[45] Apr. 22, 1975

[54] DENSITOMETER

[75] Inventor: Charles Eveleigh Miller, Boulder, Colo.

[73] Assignee: International Telephone and Telegraph Corporation, New York, N.Y.

[22] Filed: Oct. 4, 1973

[21] Appl. No.: 403,499

[52] U.S. Cl............................................. 73/32 A
[51] Int. Cl. ............................................. G01n 9/00
[58] Field of Search.......... 73/32 A, 32 R, 30, 67.1, 73/67.2, 194 B, 10 V

[56] References Cited
UNITED STATES PATENTS

| | | | |
|---|---|---|---|
| 2,889,702 | 6/1959 | Brooking............................ | 73/32 R |
| 3,600,934 | 8/1971 | Hendrix.............................. | 73/67.2 |
| 3,620,069 | 11/1971 | Cole................................... | 73/67.2 |
| 3,677,067 | 7/1972 | Miller et al. ........................ | 73/32 A |
| 3,713,324 | 1/1973 | Miller et al. ........................ | 73/32 A |
| 3,805,592 | 4/1974 | Miller et al. ........................ | 73/32 A |

*Primary Examiner*—Richard C. Queisser
*Assistant Examiner*—Stephen A. Kreitman
*Attorney, Agent, or Firm*—A. Donald Stolzy

[57] ABSTRACT

A vibration densitometer including a cantilevered leaf spring vane. Unexpectedly the cantilevered vane broadens the range of the instrument and makes it possible to calibrate in one fluid and to measure accurately the density of a second fluid substantially different therefrom.

6 Claims, 7 Drawing Figures

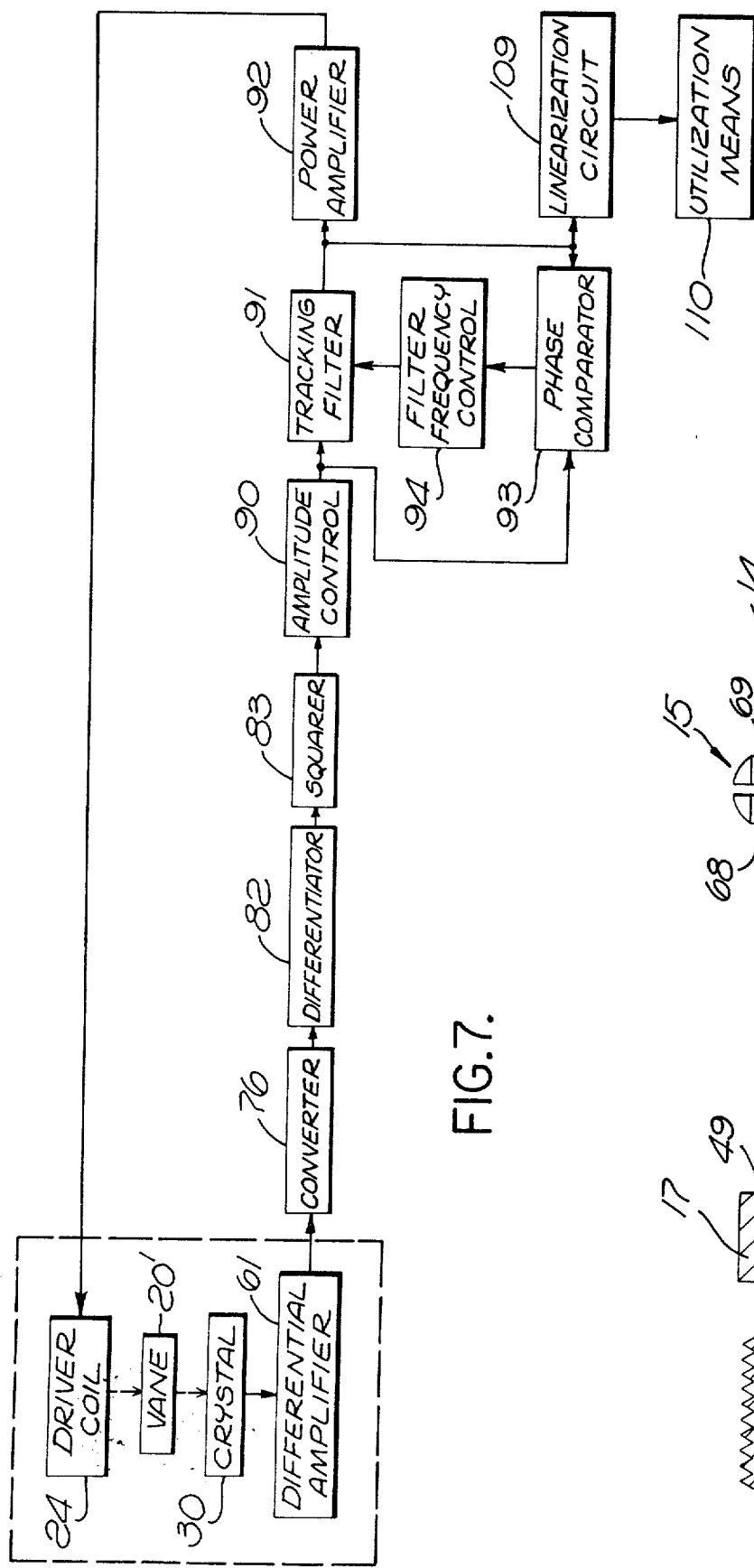
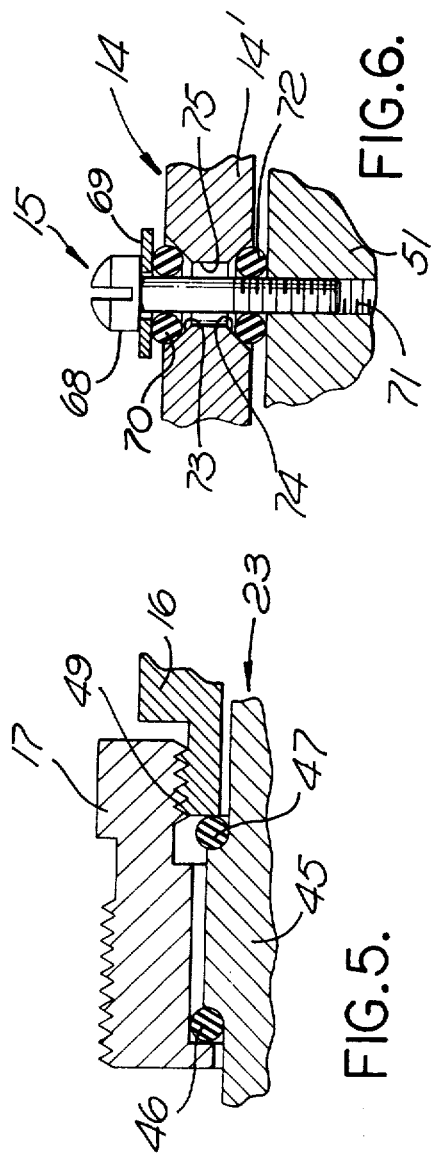

DENSITOMETER

BACKGROUND OF THE INVENTION

This invention relates to fluid sensing systems, and more particularly, to a vibration densitometer.

In the past, substantial success has been achieved in the field of vibration densitometers. For example, see U.S. Pat. No. 3,677,067. However, in the prior art it has been difficult to calibrate in one fluid and thereafter to measure accurately the density of a second fluid substantially different therefrom. It has also been a shortcoming of certain prior art vibration densitometers that the ranges thereof have been narrow.

SUMMARY OF THE INVENTION

In accordance with the present invention, the above-described and other disadvantages of the prior art are unexpectedly overcome by employing a leaf spring cantilevered vibrating vane in a vibration densitometer.

The above-described and other advantages of the present invention will be better understood from the following detailed description when considered in connection with the accompanying drawings.

BRIEF DESCRIPTION OF THE DRAWINGS

In the drawings which are to be regarded as merely illustrative:

FIG. 5 is an enlarged longitudinal sectional view of a portion of the probe shown in FIG. 1;

FIG. 6 is a longitudinal sectional view of a portion of mounting means for an electrical connector otherwise substantially fixed relative to the probe taken on the line 6—6 shown in FIG. 2; and FIG. 7 is a block diagram of a densitometer constructed in accordance with the present invention.

DESCRIPTION OF THE PREFERRED EMBODIMENT

Figure 1:
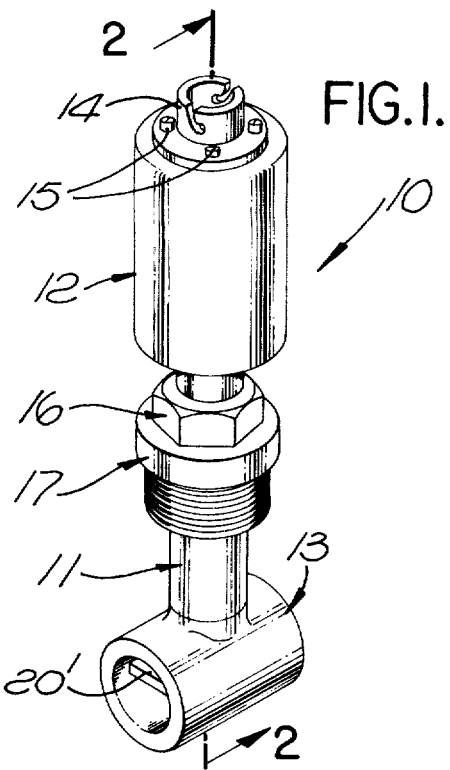
FIG. 1 is a perspective view of a densitometer probe constructed in accordance with the present invention.

In FIG. 1, the probe of the present invention is indicated at 10 having a shank 11, a housing 12 at its upper end, a tubular assembly 13 at its lower end, and an electrical connector assembly 14 at the upper end of housing 12 connected thereto by bolts 15. Annular fittings 16 and 17 extend around shank 11 for mounting probe 10 in a hollow cylindrical extension 18 of a pipeline 19, as shown in FIG. 2.

Figure 2:
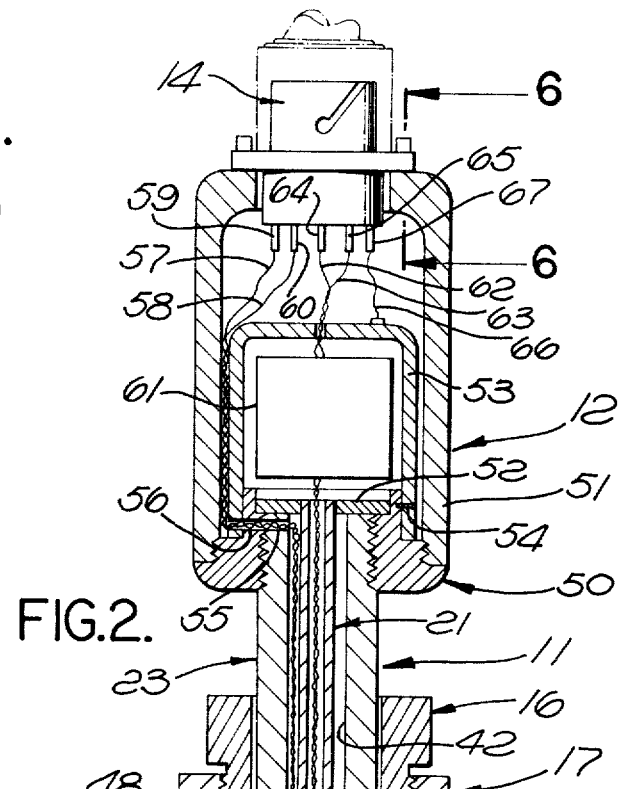
FIG. 2 is a sectional view of the probe taken on the line 2—2 shown in FIG. 1.

As shown in FIGS. 1 and 2, a stainless steel vane 20' is mounted in assembly 13 in a position perpendicular to the axis of a hollow cylindrical magnetostrictive inner tube 21. Vane 20', if desired, may be also mounted in a somewhat symmetrical position with respect to the axis of an outer sleeve 22 which houses it.

Figure 3:
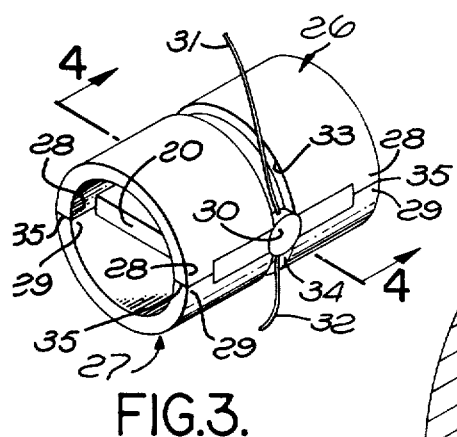
FIG. 3 is a perspective view of a group of component parts of the probe shown in FIG. 1 before it has been completely constructed.
Figure 4:
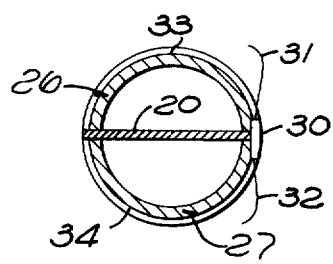
FIG. 4 is a transverse sectional view of the assembly taken on the line 4—4 shown in FIG. 3.

Vane 20' may be made from a rectangular plate 20 shown in FIGS. 3 and 4, plate 20 having flat and parallel upper and lower surfaces as shown in FIG. 3. Plate 20 may otherwise have mutually normal surfaces forming a right parallelopiped.

Shank 11 not only includes inner tube 21, but it also includes an outer magnetic tube 23 as shown in FIG. 2. A driver coil or solenoid winding 24 is also provided as shown in FIG. 2, which winding 24 is wound on a nylon bobbin 25 that is press fit onto the external surface of inner tube 21 and located in a space between the tubes 21 and 23 toward the lower end of shank 11. Coil 24 is, thus, maintained in a substantially fixed position on inner tube 21, although the same is not necessarily critical to the operation of the device of the present invention.

Plate 20 and vane 20' are supported between two half cylinders 26 and 27 as shown in FIGS. 3 and 2, respectively. According to the invention, the longitudinal edges of plate 20 are pressed together between half cylinders 26 and 27 with a pressure of, for example, 20,000 pounds per square inch because the assembly shown in FIG. 3 is inserted in sleeve 22 with an interference fit, sleeve 22 being heated prior to the said insertion.

Half cylinder 26 in FIG. 3 has four projections 28, and half cylinder 27 has four projections 29. Projections 28 and 29 serve to prevent longitudinal movement of plate 20 between half cylinder 26 and half cylinder 27 although the same is not likely due to the clamping pressure on plate 20 between half cylinder 26 and half cylinder 27.

Half cylinders 26 and 27, and plate 20 may be machined to have a flat or recess to receive a piezoelectric crystal 30. Crystal 30 has electrical leads 31 and 32 which extend around half cylinders 26 and 27 in grooves 33 and 34, respectively, to a point where they enter the hollow interior of inner tube 21 as shown in FIGS. 2, 3 and 4. This entry is made at the lower end of inner tube 21, as shown in FIG. 2.

As shown in FIG. 3, projections 28 are spaced from porjections 29. That is, projections 28 and 29 may have a slight separation at 35 to insure that the pressure contact of half cylinders 26 and 27 on plate 20 is quite high due to the said interference fit.

As shown in FIG. 2, a boss 36 is welded at 37 to sleeve 22 in a fluid tight manner. Although the device of the present invention need not always be fluid tight throughout, a glass-to-metal seal or other seal may be provided inside inner tube 21 for leads 31 and 32. Before the said interference fit is provided, if desired, crystal 30, and those portions of leads 31 and 32 in grooves 33 and 34, respectively, may be potted with an epoxy. Further, after the interference fit has been effected, the entire unit when completely assembled may be treated further by applying a bonding agent around all of the structures inside sleeve 22. Any conventional bonding process may be employed including, but not limited to, the application of a bonding agent sold under the name of "Locktite."

As stated previously, boss 36 may be welded to sleeve 22 and 37 in a fluid tight manner. Further, outer tube 23 may be threaded onto boss 36 and welded thereto at 38 in a fluid tight manner. For all practical purposes, boss 36 may, thus, be considered an integral part of outer tube 23. Boss 36, for example, is also made of a magnetic material. All of the "magnetic materials" referred to herein may be any magnetic material including, but not limited to, stainless steel. However, inner tube 21, although being magnetic, is also magnetostrictive. However, it is to be noted that inner tube 21 is employed to produce vibration, and if one feature of the present invention is used without another, the use of a magnetostrictive or magnetic material may not be required, and the vibration still practiced.

Inner tube 21 has an annular projection 39 with a shoulder 40. Outer tube 23 has a lower bore 41 separated from a smaller upper counterbore 42 by an annular shoulder 43. Shoulders 40 and 43 abut. From shoulder 40 to the lower end of inner tube 21, inner tube 21 is always in axial compression. That is, inner tube 21 is in compression not only when coil 24 is energized, but inner tube 21 is also in compression when coil 24 is de-energized. Coil 24 is energized with an alternating current which, thus, merely changes the degree of compression of inner tube 21.

Projection 39 has a hole 44 through which the electrical leads of coil 24 can pass from the location of coil 24 upwardly between tubes 21 and 23.

The manner in which probe 10 is mounted in pipeline 19 is better illustrated in FIG. 5. In FIG. 5, note will be taken that outer tube 23 has an outwardly extending radial projection 45 on each side of which rubber O-rings 46 and 47 are compressed by fittings 17 and 16, respectively. Fitting 17 is threaded into pipeline extension 18 and sealed thereto by a conventional sealing compound 48 shown in FIG. 2. In FIG. 5, note will be taken that fitting 16 is threaded inside fitting 17 at 49. The amount O-rings 46 and 47 are compressed is, therefore, determined by the position of fitting 16 relative to fitting 17. That is, fitting 16 is turned, for example, by a wrench, until the desired O-ring compression is reached.

From the construction illustrated in FIG. 5, note will be taken that only O-rings 46 and 47 contact outer tube 23, and that, therefore, shank 11 is never touched by either fitting 16 or fitting 17.

It is an advantage of the present invention that the construction of probe 10 is such that the leads from coil 24 are kept magnetically separate from the leads from crystal 30. This is true through a portion of housing 12 as will be described. Housing 12 has a fitting 50 threaded onto outer tube 23. A cylinder 51 is threaded to fitting 50. A washer 52 is press fit and thereby fixed in fitting 50 and over inner tube 21. Inner tube 21 has an upper end which may be fixed relative to or slidable in washer 52, as desired. However, preferably the external surface of inner tube 21 at its upper end is slidable through but otherwise fits contiguous or in contact with the surface of washer 52 defining the hole therethrough. A shield 53 made of a magnetic material may be fixed around fitting 50 by one or two or more screws 54. Outer tube 23 has a radial hole 55 therethrough through which the leads from coil 24 pass. Fitting 50 has a hole 56 therethrough through which the leads from coil 24 pass. Fitting 50 has a hole 56 therethrough in alignment with hole 55 through which the leads from coil 24 pass. From the outward radial extremity of hole 56, the coil leads indicated at 57 and 58 pass upwardly between cylinder 51 and shield 53 and are connected to pins 59 and 60, respectively, of the electrical connector 14. Electrical connector 14 may be a conventional five pin connector.

As stated previously, the leads 31 and 32 from crystal 30 extend upwardly through the interior of inner tube 21. At the upper end of inner tube 21, as shown in FIG. 2, leads 31 and 32 are connected to the input of a differential amplifier 61. Leads 31 and 32, thus, extend outwardly through the upper opening in inner tube 21.

Differential amplifier 61 may be entirely conventional, and mounted on a conventional card, if desired. Amplifier 61 may be supported inside shield 53 by any conventional means, if desired, or simply supported by the strength of leads 31 and 32, and output leads 62 and 63 which are connected to pins 64 and 65 of connector 14, respectively. A lead 66 provides a ground connection from shield 53 to the fifth pin 67 of connector 14.

The manner in which connector 14 is mounted on cylinder 51 is shown in FIG. 6. Only one bolt 15 is shown in FIG. 6 since all bolts 15 are similarly situated. In FIG. 6, bolt 15 is shown having a head 68, a washer 69 under head 68, an O-ring 70 under washer 69, and a shank 71 threaded into cylinder 51. A second O-ring 72 also extends around screw shank 71. O-ring 70 fits between the lower surface of washer 69 and a counter sunk frusto-conical hole 73 in a connector flange 14'. O-ring 72 fits between the upper surface of cylinder 51 and another counter sunk frusto-conical hole 74 in flange 14'. Holes 73 and 74 are connected by a bore 75. From FIG. 6, it will be noted that all the structures shown therein may vibrate, but that the amount of vibration transmitted to connector 14 may be quite small.

As may be evident, the view of FIG. 3 is a view of a subassembly which is used in fabrication. The interference fit is provided between this subassembly and sleeve 22. However, immediately after this fit is made, the structure inside sleeve 22 is not completely constructed as illustrated in FIGS. 1 and 2. To complete this construction, plate 20 must be cut in two. When this is done properly, a separation S of, for example, 20 mils when the inside diameter of sleeve 22 is, for example, 1.0 inch, will exist between a severed portion 20'' of plate 20 and vane 20' which is formed out of the remainder of plate 20 as shown in FIG. 2.

One embodiment of the densitometer of the present invention is illustrated in FIG. 7. Probe 10 is again so indicated as including driver coil 24, crystal 30 and differential amplifier 61. A current-to-voltage converter 76 is connected from amplifier 61. A differentiator 82 is connected from converter 76 to a squarer 83.

The input to differentiator 82 in FIG. 7 is mainly a sine wave voltage having a frequency which is equal to the resonant frequency detected by crystal 30. As is conventional, differentiator 82 then produces a sine wave voltage shifted in phase by 90° from the input sine wave voltage and proportional in amplitude to the absolute value of the input frequency. The output sine wave voltage of the differentiator 82 is then converted to a square wave by squarer 83. Since the units of time are not equal to the units of potential, the phrase "square wave" is, therefore, defined for use herein and in the claims to mean a voltage wave which abruptly arises to a maximum value and stays constant over half the period thereof, and then abruptly drops, for example, with an almost infinite slope again to its minimum value. The square wave then remains at its minimum value for half of its period. Thus, a square wave may have any maximum amplitude and any minimum amplitude without regard to its period or frequency.

An amplitude control 90, a tracking filter 91 and a power amplifier 92 are successively connected from squarer 83 to driver coil 84. A phase comparator 93 receives one input from the output of control 90, another input from the output of tracking filter 91, and supplies an input to a filter frequency control 94. The output of the control 94 is employed to vary electrically the frequency location of the passband of filter 91 to where the signal is, i.e., where in frequency, having the fundamental square wave output signal of control 90 is. This enables the output of control 90 to be passed through filter 91 with the least attenuation.

Amplitude control 90 may simply be a voltage divider to reduce the amplitude of the output signal of squarer 83 to a desired value. Note that if all of the blocks of the system of FIG. 7 previously described operate as an electromagnetic oscillator, the oscillation amplitude may increase to infinity at which or before which some of the component parts may fail. Thus, to put a finite limit on the amount of feedback to driver coil 24, control 90 is provided.

Power amplifier 92 produces an alternating output voltage whose average amplitude is somewhat above or below zero. That is, it has a conventional D.C. bias as explained in many publications including, but not limited to, *Magnetostriction Transducers*, published by The International Nickel Company, Inc., 67 Wall Street, New York, N.Y. 10005. See also, for example, the bibliography of this one publication. The D.C. bias is employed to keep the current flow through driver coil 24 in one direction only and to keep the frequency of the output voltage of crystal 30 equal to that of the input voltage to the driver coil 24.

Other drive systems are, however, possible without departing from the present invention. A divide-by-two divider may be employed to halve the input frequency to driver coil 24 when no D.C. bias thereto is employed.

Phase comparator 93 is entirely conventional.

In FIG. 7, the output of filter 91 is impressed upon a linearization circuit 109. The output of circuit 109 is impressed upon utilization means 110, which may be a D.C. voltmeter calibrated in units of density, if desired.

If desired, so that phase comparator 93 in FIG. 7 may receive a stronger input signal, the output of squarer 83 may be connected to comparator 93, and the input to comparator 93 from the output amplitude control 90 may be omitted. Similarly, the illustrated connection from the output of filter 91 to comparator 93 may be omitted and another squarer may be connected from the output of filter 91 to comparator lieu of the said illustrated connection. If the squarer is employed, the linearization circuit 109 may also receive its output in lieu of the output of filter 91.

If desired, converter 76, differentiator 82, squarer 83, amplitude control 90, tracking filter 91, power amplifier 92, phase comparator 93, filter frequency control 94 and linearization circuit 109 may or may not be identical to the respective ones disclosed in U.S. Pat. No. 3,677,067.

It is an outstanding feature of the device of the present invention that a formula may be developed which the output of linearization circuit 109 follows very closely. Calibration is, thus, made very easy. The development of this formula follows.

First, assume a container filled with a liquid and suspended from a fixed structure by a coiled spring. If the container is pulled downwardly, as is well known, the system will vibrate, i.e., move up and down in yo-yo fashion, at a frequency, $f$, given by $$f = \left(\frac{K}{m}\right)^{1/2} \quad (1)$$

where K is the force constant of the spring, and m is the total mass of the system.

Squaring both sides of (1) and transposing $f^2$ and $m$ $$m = \frac{K}{f^2} \quad (2)$$

If $m_c$ is the mass of the container, and $m_f$ is the mass of the fluid, $$m = m_c + m_f \quad (3)$$

From (2) and (3)

$$m_c + m_f = \frac{K}{f^2} \quad (4)$$

Subtracting $m_c$ from both sides of (4), $$m_f = \frac{K}{f^2} - m_c \quad (5)$$

By definition, mass is equal to the product of density and volume. If the fluid has a density, $d$, and a volume, $v$, from (5), $$dv = \frac{K}{f^2} - m_c \quad (6)$$

Thus, $$d = \frac{\left(\frac{K}{v}\right)}{f^2} - \frac{m_c}{v} \quad (7)$$

Since K, $m_c$ and $v$ are all constants, we can define constants, A and B, in (8) and (9), respectively, as follows:

$$A = \frac{K}{v} \quad (8)$$

$$B = -\frac{m_c}{v} \quad (9)$$

Combining (7), (8) and (9), $$d = \frac{A}{f^2} + B \quad (10)$$

In accordance with the device of the present invention, it is striking that an output can be reduced from linearization circuit 109 that will be directly proportional to $d$ as defined in (10) within a very small accuracy tolerance of ±0.1 percent over a wide range from about 0.08 pounds per cubic foot to about 80.0 pounds per cubic foot. $d$ then becomes the density of the liquid or gas under test, $f$ is one of the frequencies at which vane 20' resonates, preferably the lowest or first resonant frequency. As stated previously, A and B are constants.

The unique character of the invention which causes the output of linearization circuit 109 to follow $d$ makes it possible to calibrate the densitometer of FIG. 7 very easily, quickly and accurately.

The first step in calibration is to immerse probe 10 from entirely below fitting 17 in a first fluid of known density $d_a$, and measure the resonant frequency $f_a$. The second step is to immerse probe 10 entirely below fitting 17 in a second fluid of known density $d_b$, and measure the resonant frequency, $f_b$, where $d_b$ is not equal to $d_a$. That is, the second fluid should not be the same fluid as the first fluid.

After the said calibration steps have been performed, the desired constants, A and B, may then be calculated from the following simultaneous equations (11) and (12), i.e., two equations and two unknowns.

$$d_a = \frac{A}{f_a^2} + B \quad (11)$$

$$d_b = \frac{A}{f_b^2} + B \quad (12)$$

$$d_a - d_b = \frac{A(f_b^2 - f_a^2)}{f_a^2 f_b^2} \quad (13)$$

$$A = \frac{f_a^2 f_b^2 (d_a - d_b)}{f_b^2 - f_a^2} \quad (14)$$

$$B = d_a - \frac{A}{f_a^2} \quad (15)$$

$$B = d_a - \left(\frac{1}{f_a^2}\right)\left(\frac{f_a^2 f_b^2 (d_a - d_b)}{f_b^2 - f_a^2}\right) \quad (16)$$

$$B = \frac{(d_a(f_b^2 - f_a^2)) - f_b^2(d_a - d_b)}{f_b^2 - f_a^2} \quad (17)$$

$$B = \frac{d_a f_b^2 - d_a f_a^2 - d_a f_b^2 + d_b f_b^2}{f_b^2 - f_a^2} \quad (18)$$

$$B = \frac{d_b f_b^2 - d_a f_a^2}{f_b^2 - f_a^2} \quad (19)$$

Note that A is a function of amplifier gain, and B is the level shift, i.e., "SPAN" and "ZERO" adjustments, respectively. See U.S. Pat. No. 3,677,067.

OPERATION

In the operation of the densitometer shown in FIG. 7, ambient noise will cause detector 30 to pick up signals in a band of frequencies including the resonant frequency of the electromagnetic oscillator. That is, signals will be amplified by amplifier 61, converted from a current to a voltage by converter 76, and differentiated by differentiator 82. The output of differentiator 82 will, thus, be a sine wave which is converted into a square wave by squarer 83. Amplitude control 90 may be used to reduce the output of squarer 83 to a limiting value, if desired. The frequency location of the passband of tracking filter 91 will then be varied by filter frequency control 94 to follow or pass the fundamental frequency of the output of control 90 to power amplifier 92 with a minimum attenuation. This will be done in accordance with the difference between the phases of the output signals of control 90 and filter 91 by phase comparator 93 through filter frequency control 94. Power amplifier 92 will then drive coil 24 with a signal in phase with the resonant frequency signal output of crystal 30. The vibration produced by energization of coil 24 will then increase in amplitude until limited by amplitude control 90. At this time, the amplitude of the vibration will reach an approximately quiescent level. Should fluid be flowing in pipeline 19, and should the density of the fluid change, the frequency of the output signal of tracking filter 91 will also change. Linearization circuit 109 will then produce a D.C. output voltage directly proportional to density. Utilization means 110, if a D.C. voltmeter properly calibrated in density will then indicate density.

Note will be taken that parts of the probe 10 are vibrated because the alternating signal applied to coil 24, as shown in FIG. 2, will place varying amounts of radial compression on half cylinder 26, inner tube 21 expanding and contracting axially between shoulder 40 and the abutment of inner tube 21 at its lower end with half cylinder 26.

The structure illustrated in FIG. 7 is, of course, not limited to density indication. For example, utilization means 110 may not only be a D.C. voltmeter calibrated in density, it also may be a process controller or otherwise. Further, the structures shown in FIG. 7 with the utilization means 110 are those structures which will be sold most often to the customer. The structures in FIG. 7 without utilization means 110, thus, have utility in themselves like a careburetor for an internal combustion engine.

In accordance with the foregoing, the word "densitometer" is hereby defined for use herein and for use in the claims to include, but not be limited to, the structures of the type shown in FIG. 7 either with or without utilization means 110.

By this reference hereto, the entire disclosure of U.S. Pat. No. 3,677,067 is hereby incorporated herein hereat.

Copending application Ser. No. 265,327 filed June 22, 1972, by G. L. Schlatter and C. E. Miller for METHOD OF AND APPARATUS FOR PRODUCING FLUID GRAVITY AND DENSITY ANALOGS AND FLOWMETERS INCORPORATING GRAVITOMETERS, is hereby cited as of interest.

Alternatively, cylinder halves 26 and 27 may be electron beam welded together in the positions thereof shown in FIG. 3 before the same are inserted inside sleeve 22 for the said interference fit therebetween.

In accordance with the present invention, probe 10 may either be resiliently mounted relative to pipeline 19, as shown in FIG. 2, or probe 10 may be mounted in a fixed position relative thereto in accordance with the disclosure in U.S. Pat. No. 3,741,000. For this reason, by this reference hereto, the entire disclosure of the said U.S. Pat. No. 3,741,000 is hereby incorporated herein hereat.

What is claimed is:

1. A densitometer comprising: a probe including a leaf spring cantilevered vane having a free end and a fixed end, said probe including a housing and first means connected to said housing mounting said vane fixed end in a substantially fixed position relative to said housing; second means having an input lead and being actuable to vibrate said vane free end; third means having an output lead and being mounted contiguous to said vane in a manner to produce a first output signal on said output lead thereof; an output junction; fourth means connecting said third means output lead to said output junction; and fifth means connecting said output junction to said second means input lead; one of said fourth and fifth means including an amplifier of a gain sufficient to cause said vane and said second, third, fourth and fifth means to act as a closed loop electromechanical oscillator in which the loop gain is adequate to sustain vibration of said vane continuously, the signal appearing at said output junction changing in frequency with the density of the fluid in which said vane is immersed; and sixth means having input and output leads, said sixth means input lead being connected from said output junction, said sixth means being actuable in response to the frequency of the output signal appearing at said output junction for producing an output signal on said sixth means output lead of a magnitude directly proportional to the density of the fluid in which said vane is immersed.

2. The invention as defined in claim 1, wherein utilization means are provided having an input lead connected from said sixth means output lead.

3. The invention as defined in claim 2, wherein said utilization means includes a voltmeter calibrated in units of fluid density.

4. A densitometer comprising: a probe including a leaf spring cantilevered vane having a free end and a fixed end, said probe including a housing and a vane support connected from said housing, said vane support holding said vane fixed end in a substantially fixed position relative to said housing; first means having an input lead and being actuable to vibrate said support, said vane support being constructed in a manner such that said vibration thereof is transmitted to said vane to vibrate the same; second means having an output lead and being mounted contiguous to said vane in a manner to produce a first output signal on said output lead thereof; an output junction; third means connecting said second means output lead to said output junction; fourth means connecting said output junction to said first means input lead; one of said third and fourth means including an amplifier of a gain sufficient to cause said vane and said first, second, third and fourth means to act as a closed loop electromechanical oscillator in which the loop gain is adequate to sustain vibration of said vane continuously, the signal appearing at said output junction changing in frequency with the density of the fluid in which said vane is immersed; and fifth means having input and output leads, said fifth means input lead being connected from said output junction, said fifth means being actuable in response to the frequency of the output signal appearing at said output junction for producing an output signal on said fifth means output lead of a magnitude directly proportional to the density of the fluid in which said vane is immersed.

5. The invention as defined in claim 4, wherein utilization means are provided having an input lead connected from said fifth means output lead.

6. The invention as defined in claim 5, wherein said utilization means includes a voltmeter calibrated in units of fluid density.

* * * * *